J. S. HIND.
HEAT DISTRIBUTING DEVICE.
APPLICATION FILED DEC. 31, 1919.

1,368,337.

Patented Feb. 15, 1921.
2 SHEETS—SHEET 1.

INVENTOR
John S. Hind,
BY
James Sheehy & Co.,
ATTORNEYS.

J. S. HIND.
HEAT DISTRIBUTING DEVICE.
APPLICATION FILED DEC. 31, 1919.

1,368,337.

Patented Feb. 15, 1921.
2 SHEETS—SHEET 2.

INVENTOR
J. S. Hind

UNITED STATES PATENT OFFICE.

JOHN S. HIND, OF SPRINGFIELD, MISSOURI.

HEAT-DISTRIBUTING DEVICE.

1,368,337.  Specification of Letters Patent.  Patented Feb. 15, 1921.

Application filed December 31, 1919. Serial No. 348,641.

*To all whom it may concern:*

Be it known that I, JOHN S. HIND, a citizen of the United States, residing at Springfield, in the county of Greene and State of Missouri, have invented new and useful Improvements in Heat-Distributing Devices, of which the following is a specification.

My present invention pertains to heat distributing devices and more particularly to the use of such a device when employed in connection with a canning tank or other tank in which it is desirable to maintain the water in the tank at an even and intense heat.

The device when employed in the proper manner will diffuse heat within the tank and intensify said heat to a high degree.

The invention in all of its details will be fully understood from the following description and claim when the same are read in connection with the drawings accompanying and forming part of this specification in which:—

Similar numerals of reference designate corresponding parts in all of the views of the drawings.

Figure 1:
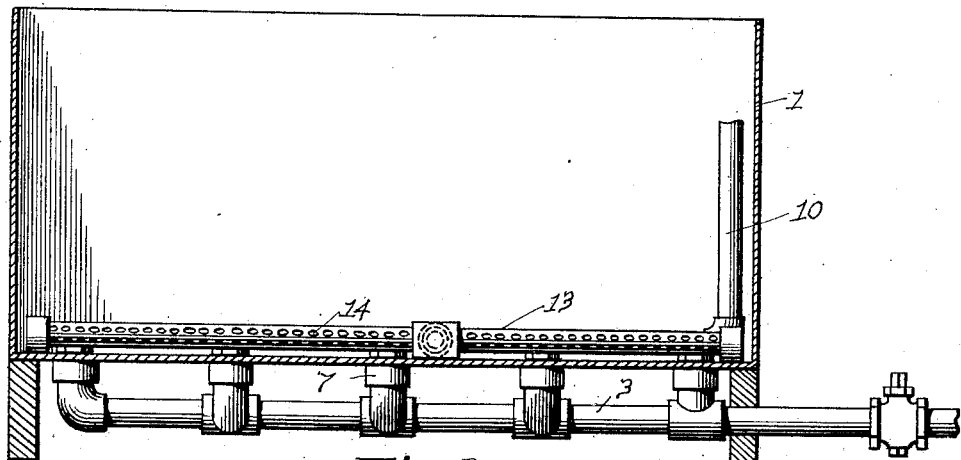
Figure 1 is a vertical sectional view taken in the plane indicated by line 1—1 of Fig. 4.
Figure 2:
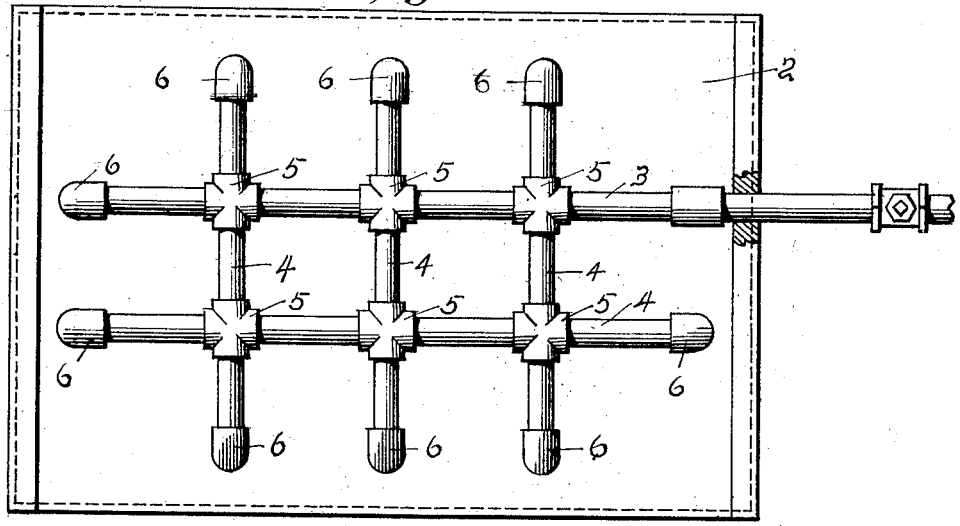
Fig. 2 is a bottom plan view of Fig. 1.

The tank 1 is of the ordinary well known construction and through one of the side walls or in fact at any suitable point below the bottom wall 2, I introduce a water inlet pipe 3; said pipe 3 terminating and communicating with branch pipes 4.

The pipes 3 and 4 are joined by the unions 5 and at their ends the pipes 3 and 4 terminate in elbows 6 and above said elbows 6 I provide the collars 7.

Within the elbows are nipples 8 that pass through the elbows 6 and collars 7 and enter the bottom wall 2 of the tank 1.

Figure 3:
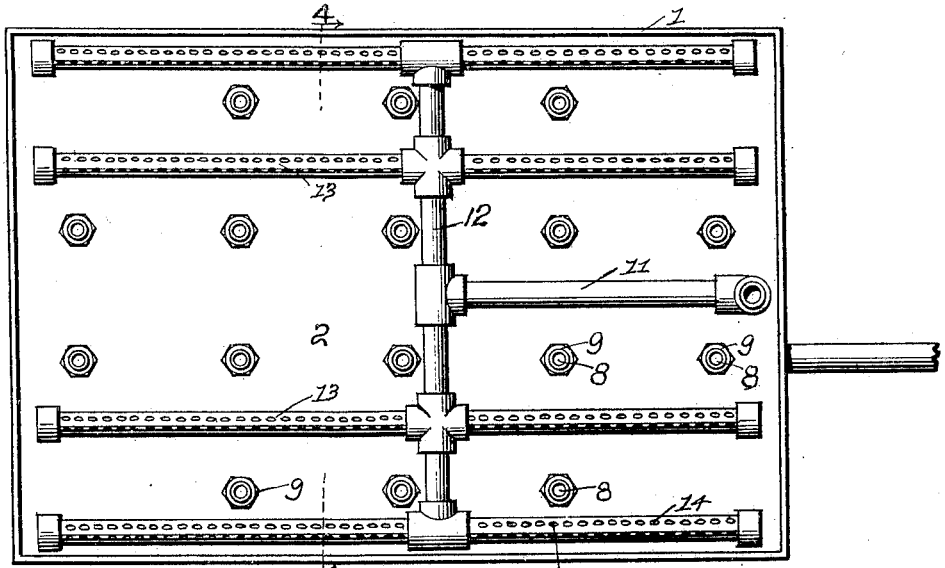
Fig. 3, is a top plan view looking into the tank.
Figure 4:
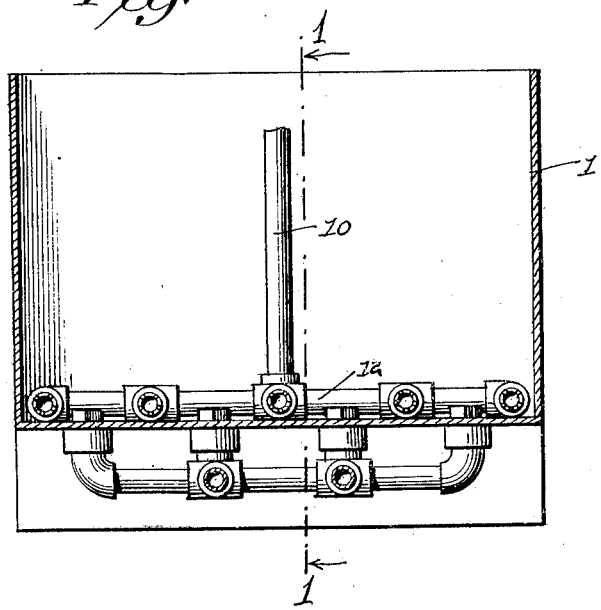
Fig. 4 is a transverse section taken in the plane indicated by the line 4—4 of Fig. 3, and looking in the direction of the arrow.

The nipples 8 are secured to the inside of bottom wall 2 of the tank by means of gaskets and lock nuts 9 as shown in Fig. 3.

As clearly shown in Fig. 3, I provide within the tank 1 and resting on the bottom wall 2 the steam introducing device of my invention. This device comprises an inlet pipe 10 that extends upwardly within the tank and preferably near one end wall thereof and said pipe has an extension 11 that rests adjacent the bottom wall 2 of the tank. This pipe 11 also communicates with a pipe 12 that extends in a direction opposite to pipe 11.

As clearly shown in Fig. 3 the pipe 12 is provided with a series of extensions 13 in which are provided vent openings 14 whereby the steam will be evenly distributed within and circulate about the interior of the tank.

In the practical use of my novel device, the tank when desired may be arranged above a furnace with the water pipes resting directly over the furnace fire. Water is then introduced through the inlet pipe and during its circulation through the pipes 4 it will become highly heated. The water will then enter the tank 1 through the nipples 8. Steam is then introduced into the pipe 10 and will circulate into the pipes 13 and be forced through the vents 14 and hence the water will be stirred up in the tank and the heat of the water in the tank will not only be greatly intensified but the temperature of the water throughout the tank will be at an even point. Moreover intense heat at one point and moderate heat at another will be effectually overcome.

I would have it distinctly understood that the device may be employed with the steam in combination with the water circulating means or may be used with the steam arrangement alone or the water circulating and heating arrangement alone that it may not be practical to provide steam at certain times or places whereas at other times it may be impractical to provide a furnace fire. However, in whatever manner employed the temperature of water in the tank will be maintained at a very high degree.

It will be gathered from the foregoing that my device is simple and inexpensive to produce and comprises no delicate parts such as are likely to get out of order after a short period of use. I would distinctly have it understood that I do not wish to be confined in the use of my device to canning tanks and also as to the relative arrangement or dimensions of the various elements comprised in the device for the reason that I reserve the right to make such changes or modifications as fairly fall within the scope of my appended claim.

Having described my invention what I claim and desire to secure by Letters-Patent is:—

In a device for the purpose set forth, the combination of a tank, a water supply pipe that passes through one side wall of the tank and rests below said tank, water circulating pipes secured to and diverging from the inlet pipe, gaskets and lock-nuts for securing the diverging pipes to the underside of the tank; said circulating pipes entering the bottom wall of the tank and a steam inlet entering the upper end of the tank and extending downwardly to the bottom wall of the tank, and steam pipes secured to the steam inlet pipe and resting slightly above the bottom wall of the tank and apertures formed in the last-named pipes for emission of the steam therefrom.

In testimony whereof I have hereunto set my hand in presence of two subscribing witnesses.

JOHN S. HIND.

Witnesses:
JOHN W. FAIRBANKS,
L. E. HOFFMAN.